United States Patent
Taylor

(10) Patent No.: US 8,506,676 B2
(45) Date of Patent: Aug. 13, 2013

(54) WASTE HEAT RECOVERY SYSTEM AND METHOD OF USING WASTE HEAT

(75) Inventor: Robert Warren Taylor, Ponte Vedra Beach, FL (US)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 13/025,612

(22) Filed: Feb. 11, 2011

(65) Prior Publication Data

US 2012/0204533 A1 Aug. 16, 2012

(51) Int. Cl.
*B01D 53/22* (2006.01)
*F02C 6/00* (2006.01)
*F02C 6/18* (2006.01)

(52) U.S. Cl.
USPC ............. 95/45; 95/47; 95/49; 95/50; 95/51; 96/4; 60/39.182; 60/657; 431/5

(58) Field of Classification Search
USPC ........ 95/45, 47, 49, 50, 51; 96/4; 60/39.182, 60/657; 431/5
See application file for complete search history.

(56) References Cited

U.S. PATENT DOCUMENTS

| | | | |
|---|---|---|---|
| 5,174,866 A * | 12/1992 | Chen et al. | 95/54 |
| 6,537,465 B2 | 3/2003 | Gottzmann et al. | |
| 6,830,596 B1 | 12/2004 | Deckman et al. | |
| 7,217,304 B2 | 5/2007 | Deckman et al. | |
| 7,695,708 B2 | 4/2010 | Peng et al. | |
| 2008/0011160 A1* | 1/2008 | Bowman et al. | 96/4 |
| 2008/0011161 A1* | 1/2008 | Finkenrath et al. | 96/4 |
| 2009/0230359 A1 | 9/2009 | Guvelioglu et al. | |
| 2010/0314136 A1 | 12/2010 | Zubrin et al. | |
| 2011/0162382 A1* | 7/2011 | Riensche et al. | 60/39.182 |
| 2012/0103190 A1* | 5/2012 | Wallace | 95/55 |

FOREIGN PATENT DOCUMENTS

WO WO 2010/031366 A2 * 3/2010

* cited by examiner

*Primary Examiner* — Jason M Greene
(74) *Attorney, Agent, or Firm* — Armstrong Teasdale LLP

(57) ABSTRACT

A waste heat recovery system is provided. The waste heat recovery system includes a gas separation apparatus that includes a chamber and at least one membrane positioned within the chamber. The gas separation apparatus is configured to produce a retentate that includes at least a combustible gas and a permeate that includes at least a waste gas, wherein the waste gas includes at least a noncombustible gas. Moreover, the waste heat recovery system includes a burner that is coupled to the gas separation apparatus, wherein the burner is configured to receive the permeate and to combust the permeate such that heat is generated from the permeate. Further, a heat recovery steam generator is coupled to the burner and configured to recover heat generated by the burner.

20 Claims, 3 Drawing Sheets

WASTE HEAT RECOVERY SYSTEM AND METHOD OF USING WASTE HEAT

BACKGROUND OF THE INVENTION

The field of the invention relates generally to power generation systems and, more particularly, to a waste heat recovery system for use with power generation systems and a method of using waste heat.

At least some known power generation systems, such as combined-cycle systems, include an air compressor, a gas turbine engine, a heat recovery steam generator (HRSG), a steam turbine, and a gas separation system. Gases that are optimal for combustion are channeled from a gas source to the gas turbine engine to enable the gas turbine engine to generate a power output. Exhaust gases from the gas turbine engine are channeled to the HRSG, wherein the exhaust gas is converted to steam. The steam is then channeled to the steam turbine to generate power therefrom.

The gas source may also include various constituents that are not optimal for combustion, such as hydrogen sulfide gas ($H_2S$), carbon dioxide gas ($CO_2$), and/or nitrogen gas ($N_2$). As such, the gases from the gas source may be channeled to the gas separation system, wherein noncombustible gases are separated from the combustible gases such that only the combustible gases are channeled to the gas turbine engine. For example, the gases may be separated via a gas separation membrane in which, depending on the type of membrane used, combustible gases, such as methane gas, are unable to pass through the membrane and become part of the retentate, and the other gases pass through the membrane and become part of the permeate.

Gases in the retentate are channeled to the gas turbine engine for use in the power generation process. In contrast, the permeate does not have an immediate use for the power generation process. However, the permeate may, in fact, contain combustible gases, such as methane gas. More specifically, known gas separation membranes used in such separation processes are not entirely selective, and allow for a portion of combustible gases to pass through the membrane. Since there is no immediate use of the permeate as part of the power generation process, combustible gases within the permeate represent a loss to the system as all available energy for power generation is not completely utilized.

BRIEF DESCRIPTION OF THE INVENTION

In one embodiment, a waste heat recovery system is provided. The waste heat recovery system includes a gas separation apparatus that includes a chamber and at least one membrane positioned within the chamber. The gas separation apparatus is configured to produce a retentate that includes at least a combustible gas and a permeate that includes at least a waste gas, wherein the waste gas includes at least a noncombustible gas. Moreover, the waste heat recovery system includes a burner that is coupled to the gas separation apparatus, wherein the burner is configured to receive the permeate and to combust the permeate such that heat is generated from the permeate. Further, a heat recovery steam generator is coupled to the burner and configured to recover heat generated by the burner.

In another embodiment, a power generation system is provided. The power generation system includes at least one turbine engine and a waste heat recovery system that is coupled to the turbine engine. The waste heat recovery system includes a gas separation apparatus that includes a chamber and at least one membrane positioned within the chamber. The gas separation apparatus is configured to produce a retentate that includes at least a a combustible gas and a permeate that includes at least a waste gas, wherein the waste gas includes at least a noncombustible gas. Moreover, the waste heat recovery system includes a burner that is coupled to the gas separation apparatus, wherein the burner is configured to receive the permeate and to combust the permeate such that heat is generated from the permeate. Further, a heat recovery steam generator is coupled to the burner and configured to recover heat generated by the burner.

In yet another embodiment, a method of using waste heat is provided. The method includes separating a mixture of gaseous components via at least one membrane to produce a retentate that includes at least a combustible gas and a permeate that includes at least a waste gas, wherein the waste gas includes at least a noncombustible gas. The permeate is channeled to a burner and the permeate is combusted via the burner such that heat is generated. Moreover, the heat generated by the burner is recovered by a heat recovery steam generator.

DETAILED DESCRIPTION OF THE INVENTION

The exemplary methods and systems described herein overcome at least some disadvantages associated with known power generation systems that include membrane gas separation systems. In particular, the embodiments described herein provide a waste heat recovery system that facilitates using all available energy to generate power. More specifically, the waste heat recovery system includes a gas separation apparatus that includes at least one membrane positioned within a chamber. The gas separation apparatus produces a retentate that includes at least methane gas, and a permeate that includes at least one gaseous component. Moreover, the waste heat recovery system includes a burner that receives the permeate and that combusts the permeate to generate heat therefrom. Further, a heat recovery steam generator is positioned to recover heat generated by the burner such that substantially all available energy is utilized to generate power.

Figure 1:
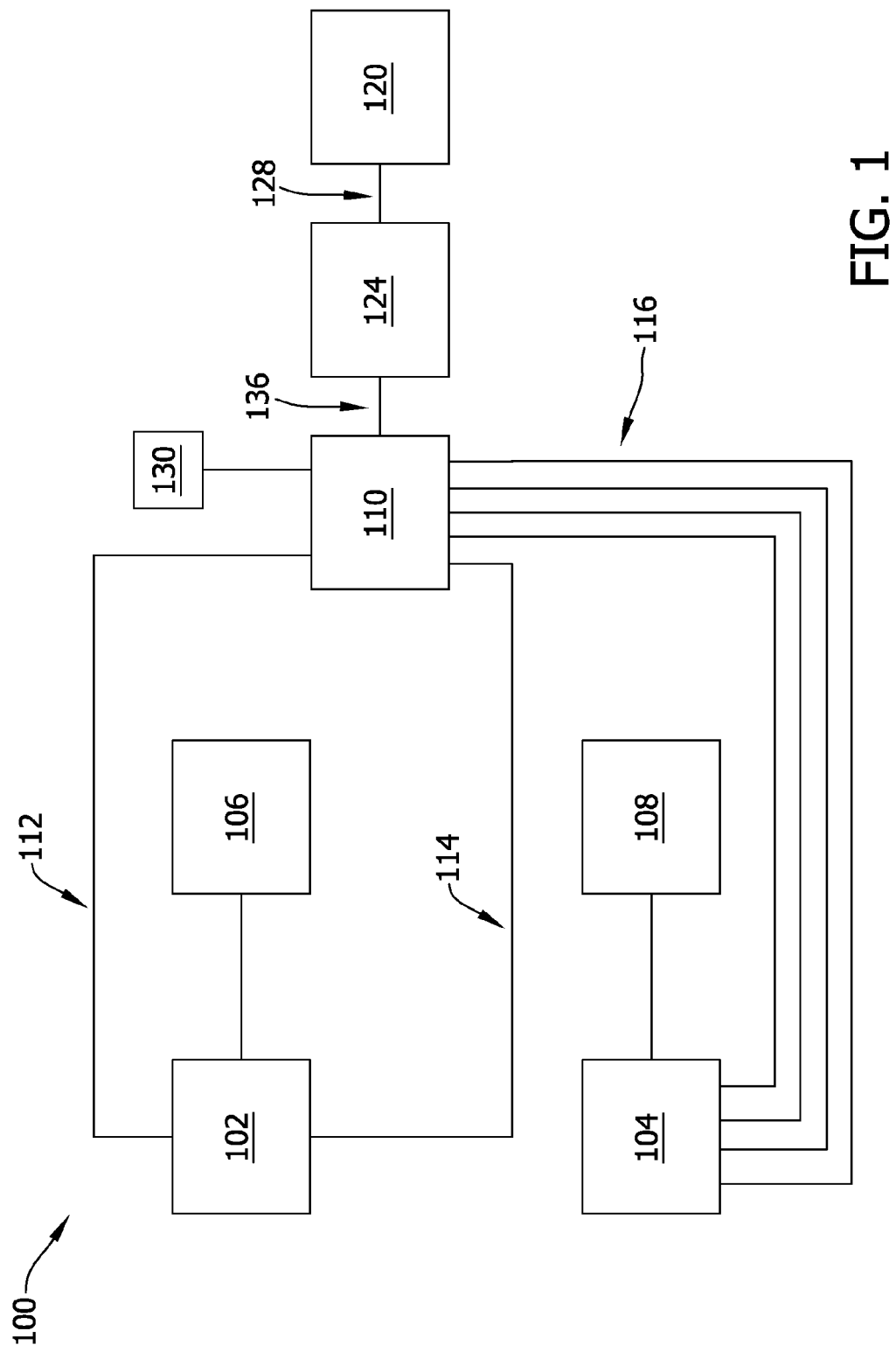
FIG. 1 is a block diagram of an exemplary power generation system.

FIG. 1 is a schematic illustration of an exemplary power generation system 100. More specifically, in the exemplary embodiment, system 100 is a combined-cycle power generation system. Although the exemplary embodiment illustrates a combined-cycle power generation system, the present invention is not limited to combined-cycle power generation systems, and one of ordinary skill in the art will appreciate that the current invention may be used in connection with any type of power generation system and/or heat recovery system.

In the exemplary embodiment, system 100 includes at least one gas turbine engine 102 and at least one steam turbine 104. Gas turbine engine 102 is rotatably coupled to a first electric power generator 106, and steam turbine 104 is rotatably coupled to a second electric power generator 108. Moreover, in the exemplary embodiment, gas turbine engine 102 and steam turbine 104 are each coupled to a waste heat recovery system 110 that includes at least one heat recovery steam generator (HRSG) (not shown in FIG. 1). More specifically, in the exemplary embodiment, gas turbine engine 102 is coupled in flow communication with waste heat recovery system 110 via a fluid conduit 112 and via an exhaust conduit 114. Similarly, steam turbine 104 is coupled in flow communication with waste heat recovery system 110 via a plurality of steam conduits 116.

Moreover, in the exemplary embodiment, power generation system 100 includes an oil well 120 that contains a mixture of oil and natural gas. A separation system 124 is coupled to oil well 120, via a fluid conduit 128, for use in separating the natural gas from the oil. Moreover, in the exemplary embodiment, system 100 includes an air compressor 130 that is coupled in flow communication with waste heat recovery system 110. In the exemplary embodiment, air compressor 130 is a low pressure air compressor. Alternatively, air compressor 130 may be any type of compressor that enables system 100 to function as described herein. Moreover, in the exemplary embodiment, waste heat recovery system 110 is coupled to separation system 124 via a fluid conduit 136.

During operation, compressor 130 compresses ambient air that is channeled to waste heat recovery system 110 to provide oxygen to system 110. In some embodiments, in addition to or the alternative, compressed air from a gas turbine engine compressor (not shown) may be supplied to system 110. Moreover, in the exemplary embodiment, oil containing a mixture of oil and natural gas is channeled from oil well 120 to separation system 124 via conduit 128. Separation system 124 separates natural gas from the oil. Natural gas separated from the oil (hereinafter referred to as "process gas") includes at least one gaseous component, such as methane gas, hydrogen sulfide gas, carbon dioxide gas, and/or nitrogen gas.

In the exemplary embodiment, the process gas is channeled to waste heat recovery system 110, wherein substantially all of the combustible gases that are separated from the process gas are channeled to gas turbine engine 102 for combustion. More specifically, in the exemplary embodiment, waste heat recovery system 110 generates a retentate that includes gases that may be combusted, such as methane gas. Waste heat recovery system 110 also generates a permeate that includes at least a waste gas. In the exemplary embodiment, the permeate includes at least methane gas and noncombustible gases, such as hydrogen sulfide gas, carbon dioxide gas, and nitrogen gas. Alternatively, waste heat recovery system 110 may generate a retentate that includes at least a waste gas that includes at least methane gas and that includes noncombustible gases, such as hydrogen sulfide gas, carbon dioxide gas, and nitrogen gas, and waste heat recovery system 110 may generate a permeate that includes gases that may be combusted, such as methane gas.

In the exemplary embodiment, gases that are part of the retentate are channeled to gas turbine engine 102 via conduit 112, wherein gas turbine engine 102 generates power used to drive generator 106. Generator 106 supplies electrical power to a power grid (not shown). Moreover, in the exemplary embodiment, exhaust gases from gas turbine engine 102 are channeled to waste heat recovery system 110 via conduit 114, wherein the exhaust gases are converted to steam. The steam is then channeled to steam turbine 104, via conduits 116, to enable steam turbine 104 to generate power.

Further, in the exemplary embodiment, waste heat recovery system 110 recovers heat from the permeate that is used to produce steam via the HRSG. As such, waste heat recovery system 110 facilitates using all available energy in system 100 to generate power. More specifically, the steam is channeled via conduits 116 causing steam turbine 104 to rotate and generate power. Power generated by steam turbine 104 drives generator 108 such that electrical power is transmitted to the power grid.

Figure 2:
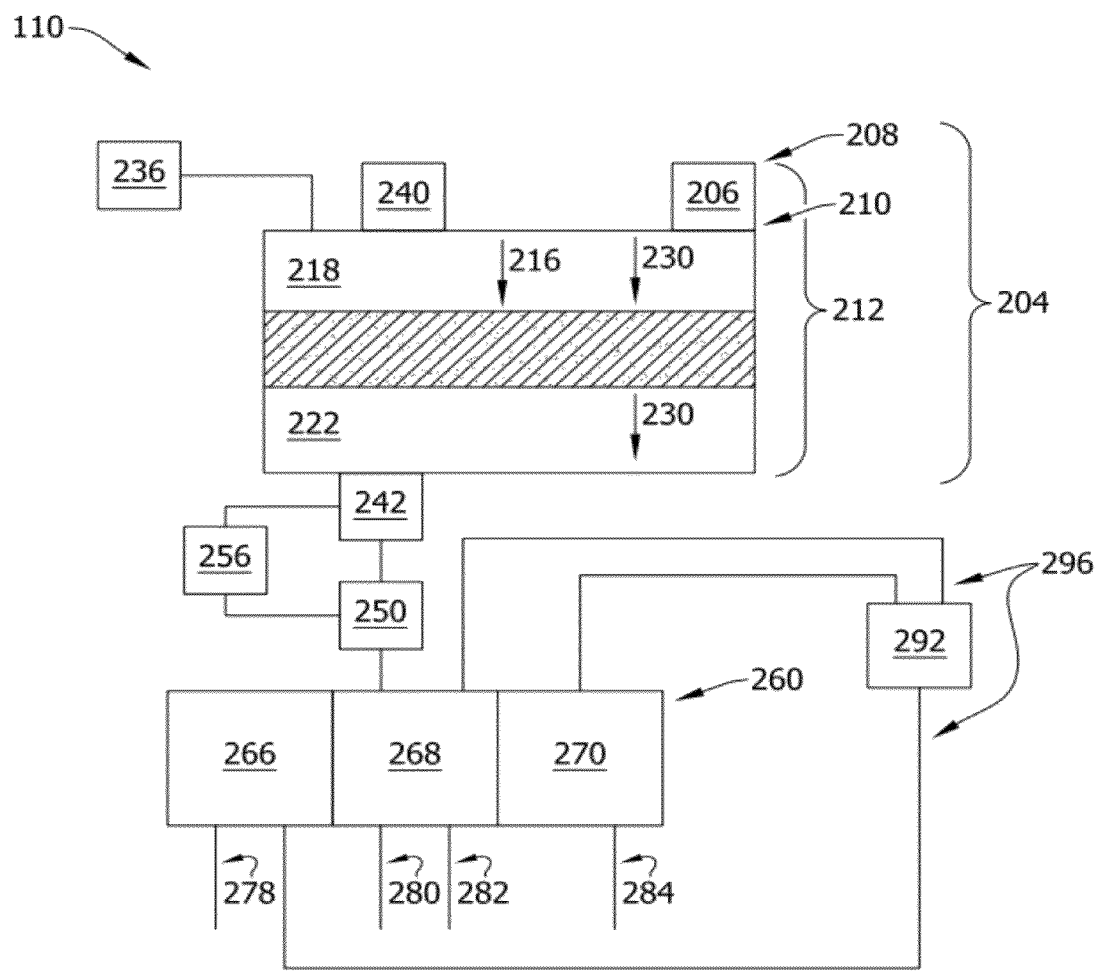
FIG. 2 is a block diagram of a waste heat recovery system that may be used with the power generation system shown in FIG. 1.

FIG. 2 is a schematic diagram of waste heat recovery system 110. In the exemplary embodiment, system 110 includes a gas separation apparatus 204 that includes an inlet 206 coupled to separation system 124 (shown in FIG. 1) via conduit 136 (shown in FIG. 1). More specifically, in the exemplary, embodiment, inlet 206 includes a first end portion 208 and a second end portion 210, wherein inlet first end portion 208 is coupled to separation system 124. Gas separation apparatus 204 also includes a separation chamber 212 that is coupled to inlet second end portion 210. At least one membrane 216 is positioned within chamber 212. Membrane 216 divides chamber 212 into a high pressure (HP) section 218 and a low pressure (LP) section 222.

In the exemplary embodiment, chamber HP section 218 extends from inlet second end portion 210 such that gas entering gas separation apparatus 204 is immediately channeled through chamber HP section 218 prior to contacting membrane 216, as illustrated by arrows 230. Moreover, in the exemplary embodiment, chamber HP section 218 operates with a relatively high pressure that is greater than approximately 150 Psi. In the exemplary embodiment, the operating pressure in HP section 218 is maintained via a pump 236 coupled to HP section 218. Alternatively, the pressure may be maintained using any device that enables gas separation apparatus 204 and/or system 110 to function as described herein. Moreover, in the exemplary embodiment, gas separation apparatus 204 includes at least a first outlet 240 and at least a second outlet 242 that are each coupled to separation chamber 212. More specifically, first outlet 240 is coupled to HP section 218, and second outlet 242 is coupled to LP section 222.

In the exemplary embodiment, membrane 216 is a microporous gas separation membrane. More specifically, in the exemplary embodiment, membrane 216 is an organic polymeric membrane that is fabricated using compounds containing molecules that include carbon hydrogen atoms. For example, membrane 216 may be a rubbery polymeric membrane that operates at a temperature above the transition temperature of glass. Membrane 216 may also be a glassy polymeric membrane that operates at temperatures below the transition temperature of glass. Alternatively, membrane 216 may be an inorganic membrane that is fabricated from materials that do not contain a carbon hydrogen group, such as zeolite, ceramic, or metal. For example, inorganic membranes such as those that include mircoporous inorganic membranes that are fabricated from amorphous silica, carbon, or zeolites may be used herein. Moreover, dense inorganic membranes that are fabricated from ceramic materials may also be used.

Furthermore, in the exemplary embodiment, waste heat recovery system 110 also includes a burner 250 that is coupled to gas separation system apparatus 204, and more specifically, burner 250 is coupled to second outlet 242. In the exemplary embodiment, burner 250 is a gas burner. Alternatively, burner 250 may be any type of burner that enables system 110 and system 124 to function as described herein. Moreover, in the exemplary embodiment, a compressor 256 is coupled to second outlet 242 and to burner 250.

In the exemplary embodiment, waste heat recovery system 110 also includes a heat recovery steam generator (HRSG) 260 that is coupled to burner 250. In the exemplary embodiment, HRSG 260 is a multi-stage heat recovery steam generator. Alternatively, HRSG 260 may be any type of heat recovery steam generator that enables system 110 and power generation system 100 (shown in FIG. 1) to function as described herein. In the exemplary embodiment, HRSG 260 includes a high pressure (HP) superheater section 266, a reheater/intermediate pressure (RH/IP) section 268, and a low pressure (LP) section 270. Moreover, in the exemplary embodiment, steam conduits 116 (shown in FIG. 1) include an HP superheated steam conduit 278 that couples HP superheater section 266 in flow communication with an HP section (not shown) in steam turbine 104 (shown in FIG. 1). Steam conduits 116 also include a cold reheat (CRH) steam conduit 280 that couples the HP section of steam turbine 104 in flow communication with RH/IP section 268. Steam conduits 116 further include a hot reheat (HRH) steam conduit 282 that couples RH/IP section 268 in flow communication with an IP section (not shown) of steam turbine 104, and an LP steam conduit 284 that couples LP section 270 in flow communication with an LP section (not shown) of steam turbine 104. Further, in the exemplary embodiment, HRSG 260 is coupled to gas turbine engine 102 (shown in FIG. 1) via conduit 114 (shown in FIG. 1). Moreover, in the exemplary embodiment, HP superheater section 266, RH/IP section 268, and LP section 270 are each coupled to a condenser 292 via a plurality of conduits 296.

During operation, oil containing a mixture of oil and natural gas is channeled from oil well 120 (shown in FIG. 1) to separation system 124 (shown in FIG. 1) via conduit 128 (shown in FIG. 1). Separation system 124 separates the natural gas from the oil and forms the process gas. The process gas formed includes at least one gaseous component, such as methane gas, hydrogen sulfide gas, carbon dioxide gas, and nitrogen gas.

In the exemplary embodiment, the process gas is channeled to waste heat recovery system 110, wherein the combustible gases are separated from the process gas for use in gas turbine engine 102. More specifically, process gas is channeled to inlet 206 via conduit 136 (shown in FIG. 1). The process gas is then channeled into chamber HP section 218, wherein the process gas contacts membrane 216. Membrane 216 separates the process gas into a retentate and a permeate. More specifically, in the exemplary embodiment, the retentate includes combustible gases, such as methane gases, that are unable to flow through the pores in membrane 216 and remain in chamber HP section 218. The permeate includes at least a waste gas that includes gases that are not ideal for combustion, such as hydrogen sulfide gas, carbon dioxide gas, and/or nitrogen gas, that flow through the pores in membrane 216 and are channeled into chamber LP section 222. Alternatively, depending on the type of membrane used, the retentate may include gases that are not ideal for combustion, such as hydrogen sulfide gas, carbon dioxide gas, and/or nitrogen gas, and the permeate may include combustible gases, such as methane gases.

In the exemplary embodiment, while the majority of methane gas is unable to pass through membrane 216, a portion of methane gas does pass through membrane 216 and become part of the permeate. As such, in the exemplary embodiment, the permeate is treated as including some combustible gases.

Moreover, in the exemplary embodiment, the gases in the retentate are directed through first outlet 240 prior to being channeled to gas turbine engine 102 (shown in FIG. 1) via conduit 112 (shown in FIG. 1). The gases enable turbine 102 to generate power used to drive generator 106. Gases in the permeate are channeled through second outlet 242 and to burner 250, wherein heat and gases are generated. Heat and gases emitted from burner 250, along with any exhaust gases generated by gas turbine engine 102, are channeled to HRSG 260. The heat and the exhaust gases are used to form steam in HRSG 260 that is channeled to steam turbine 104 via conduits 116. More specifically, in the exemplary embodiment, the heat and exhaust gas combination are channeled through HP superheater section 266 to generate a high pressure steam. After heat is removed from the gases in HP superheater section 266, the cooled gases are then channeled to RH/IP section 268, wherein intermediate pressure steam is generated. After heat is removed from the gases in RH/IP section 268, the cooled gases are then channeled to LP section 270, wherein low pressure steam is generated. The high pressure steam is channeled to the HP section of steam turbine 104 via conduit 280, and the intermediate pressure steam is channeled to the IP section of steam turbine 104 via conduit 282, and the low pressure steam is channeled to the LP section of steam turbine 104 via conduit 284. The steam drives steam turbine 104 to generate power used to drive generator 108.

Figure 3:
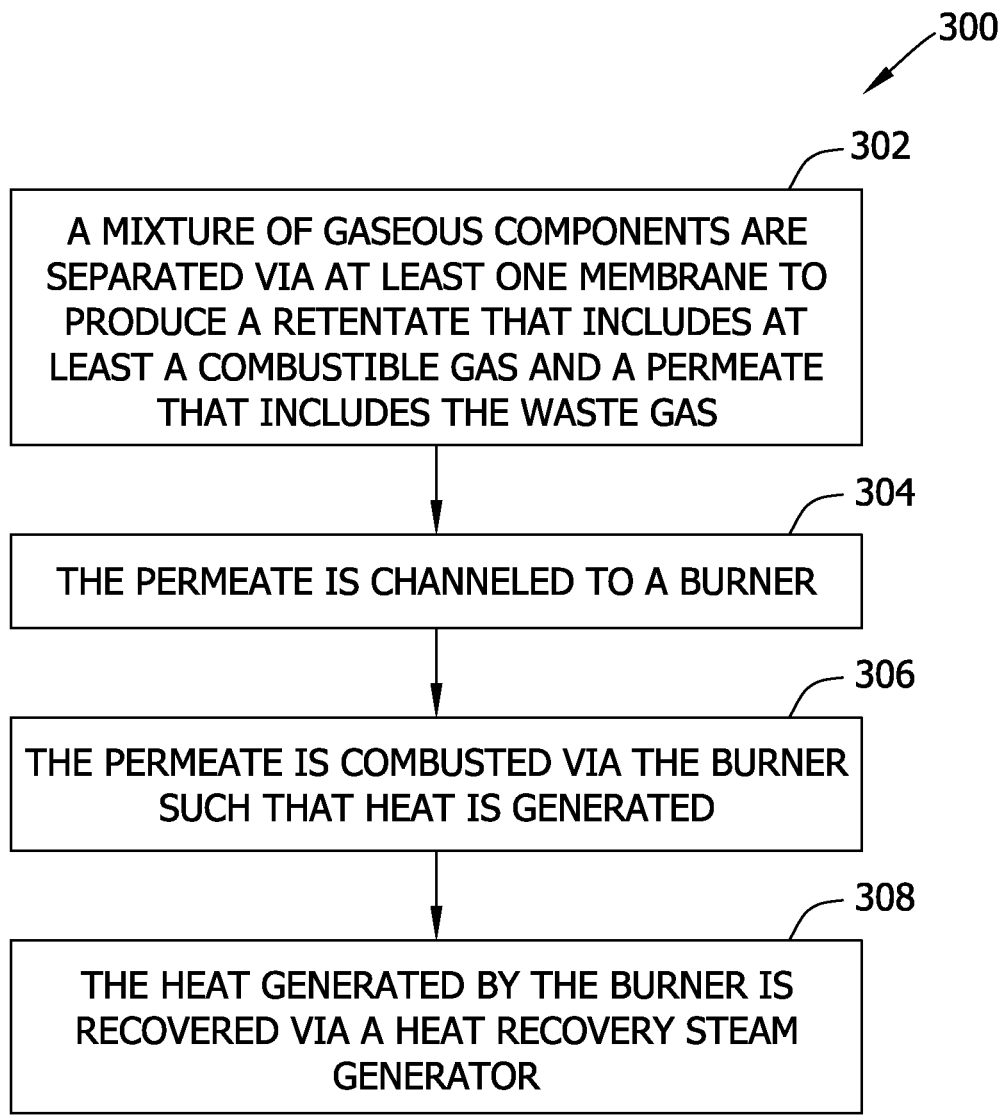
FIG. 3 is a flow chart of an exemplary method of using waste heat that uses the waste heat recovery system shown in FIG. 2.

FIG. 3 is a flow diagram illustrating an exemplary method 300 of using waste heat via a waste heat recovery system, such as waste heat recovery system 110 (shown in FIGS. 1 and 2). A mixture of gaseous components are separated 302 via at least one membrane 216 (shown in FIG. 2) to produce a retentate that includes at least a combustible gas and a permeate that includes at least a waste gas, wherein the waste gas includes at least a noncombustible gas. The permeate is channeled 304 to a burner 250 (shown in FIG. 2). The permeate is combusted via burner 250 such that heat is generated 306. The heat generated by burner 250 is recovered 308 via a heat recovery steam generator (HRSG) 260 (shown in FIG. 2).

As compared to known systems that are used to generate power and that use membrane gas separation systems, the above-described embodiments facilitate using all available energy to generate power. In particular, the embodiments described herein provide a waste heat recovery system that includes a gas separation apparatus that includes a chamber and at least one membrane positioned within the chamber and oriented to produce a retentate that includes at least methane gas, and a permeate that includes at least one gaseous component. Moreover, the waste heat recovery system includes a burner that is coupled to the gas separation apparatus. The burner receives the permeate and combusts the permeate to generate heat therefrom. Further, a heat recovery steam generator is coupled to the burner to recover heat generated by the burner. As such, substantially all available energy is utilized to generate power.

Exemplary embodiments of the system and method are described above in detail. The system and method are not limited to the specific embodiments described herein, but rather, components of the system and/or steps of the method may be utilized independently and separately from other components and/or steps described herein. For example, the system may also be used in combination with other systems and methods, and is not limited to practice with only the system as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A waste heat recovery system for use with a power generation system, said waste heat recovery system comprising:
a gas separation apparatus comprising a chamber and at least one membrane positioned within said chamber, said chamber having at least a first inlet and at least a first outlet, said gas separation apparatus configured to produce a retentate that includes at least a combustible gas and a permeate that includes at least a waste gas, wherein the waste gas includes at least a noncombustible gas, said first outlet configured to channel the retentate towards a turbine engine;
a burner coupled to said gas separation apparatus, said burner configured to receive the permeate and to combust the permeate such that heat is generated from the permeate; and
a heat recovery steam generator coupled to said burner and configured to recover heat generated by said burner.

2. A waste heat recovery system in accordance with claim 1, further comprising a compressor coupled to said gas separation apparatus and to said burner.

3. A waste heat recovery system in accordance with claim 1, wherein said at least one membrane comprises a microporous membrane.

4. A waste heat recovery system in accordance with claim 1, wherein said at least one membrane comprises at least one of a microporous inorganic membrane and a dense inorganic membrane.

5. A waste heat recovery system in accordance with claim 1, wherein said at least one membrane comprises at least one of a rubbery polymeric membrane and a glassy polymeric membrane.

6. A waste heat recovery system in accordance with claim 1, wherein said chamber has a second outlet configured to channel the permeate from said gas separation apparatus.

7. A waste heat recovery system in accordance with claim 1, wherein the retentate includes at least methane gas and the permeate includes at least one of a hydrogen sulfide gas, a carbon dioxide gas, a nitrogen gas, and a methane gas.

8. A power generation system comprising:
at least one turbine engine; and
a waste heat recovery system coupled to said at least one turbine engine, said waste heat recovery system comprising:
a gas separation apparatus comprising a chamber and at least one membrane positioned within said chamber, said chamber having at least one inlet and at least a first outlet, said gas separation apparatus configured to produce a retentate that includes at least a combustible gas and a permeate that includes at least a waste gas, wherein the waste gas includes at least a noncombustible gas, said first outlet coupled to the at least one turbine engine and configured to channel the retentate towards the at least one turbine engine;
a burner coupled to said gas separation apparatus, said burner configured to receive the permeate and to combust the permeate such that heat is generated from the permeate; and
a heat recovery steam generator coupled to said burner and configured to recover heat generated by said burner.

9. A power generation system in accordance with claim 8, wherein said at least one turbine engine comprises at least one gas turbine engine and at least one steam turbine.

10. A power generation system in accordance with claim 9, wherein said first outlet is configured to channel the retentate from said gas separation apparatus to said gas turbine engine, said gas separation apparatus comprising at least a second outlet configured to channel the permeate from said gas separation apparatus to said burner.

11. A power generation system in accordance with claim 8, wherein said waste heat recovery system further comprises a compressor coupled to said gas separation apparatus and to said burner.

12. A power generation system in accordance with claim 8, wherein the retentate includes at least methane gas and the permeate includes at least one of a hydrogen sulfide gas, a carbon dioxide gas, a nitrogen gas, and a methane gas.

13. A power generation system in accordance with claim 8, wherein said at least one membrane comprises a microporous inorganic membrane and a dense inorganic membrane.

14. A power generation system in accordance with claim 8, wherein said at least one membrane comprises at least one of a rubbery polymeric membrane and a glassy polymeric membrane.

15. A method of using a waste heat, said method comprising:
separating a mixture of gaseous components via at least one membrane to produce a retentate that includes at least a combustible gas and a permeate that includes at least a waste gas, wherein the waste gas includes at least a noncombustible gas;
channeling the retentate to a turbine engine;
channeling the permeate to a burner;
combusting the permeate via the burner such that heat is generated; and
recovering the heat generated by the burner via a heat recovery steam generator.

16. A method in accordance with claim 15, wherein separating a mixture of gaseous components further comprises separating the mixture of gaseous components via the at least one membrane to produce a retentate that includes at least methane gas and a permeate that includes at least one of a hydrogen sulfide gas, a carbon dioxide gas, a nitrogen gas, and a methane gas.

17. A method in accordance with claim 15, wherein separating a mixture of gaseous components further comprises separating the mixture of gaseous components via a microporous membrane.

18. A method in accordance with claim 15, wherein separating a mixture of gaseous components further comprises separating the mixture of gaseous components via at least one of a microporous inorganic membrane and a dense inorganic membrane.

19. A method in accordance with claim 15, wherein separating a mixture of gaseous components further comprises separating the mixture of gaseous components via at least one of a rubbery polymeric membrane and a glassy polymeric membrane.

20. A method in accordance with claim 15, wherein separating a mixture of gaseous components further comprises separating the mixture of gaseous components via at least one membrane that is positioned within a gas separation apparatus that includes at least a first outlet for channeling the retentate from the gas separation apparatus and at least a second outlet for channeling the permeate from the gas separation apparatus.

* * * * *